Sept. 18, 1956     A. J. ROGER     2,763,096
SECTIONAL TRELLIS STRUCTURE
Filed Jan. 21, 1955
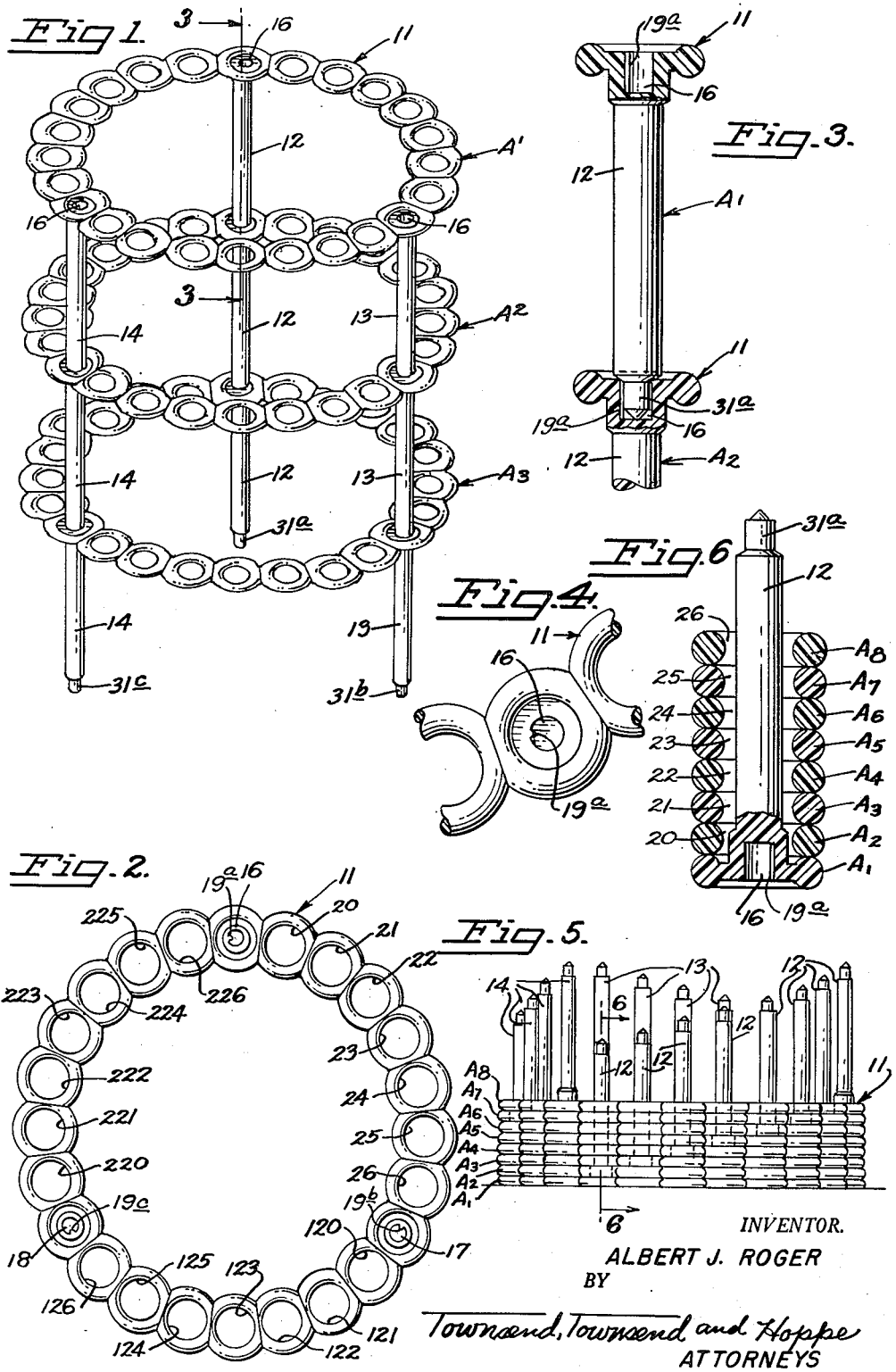
INVENTOR.
ALBERT J. ROGER
BY Townsend, Townsend and Hoppe
ATTORNEYS

United States Patent Office 2,763,096
Patented Sept. 18, 1956

2,763,096

SECTIONAL TRELLIS STRUCTURE

Albert J. Roger, Oakland, Calif.

Application January 21, 1955, Serial No. 483,395

2 Claims. (Cl. 47—45)

This invention relates to a new and improved plant trellis construction and more particularly, to a sectional trellis structure.

The particular embodiment of the invention illustrated in the drawings and which will be described hereinafter in more detail is shown as comprising a plurality of identically constructed trellis sections or units, each of which comprises a circular open frame to which is attached three spacer members or legs extending in a common direction perpendicular to the plane of the circular frame to which they are attached. The several units are positionable one upon the other in a vertical column with the spacer members or legs of each upper unit engaged with the circular frame of an adjacent lower unit.

A principal object and advantage, therefore, of the present invention is to provide a structure of the character briefly above referred to and which incorporates identically constructed trellis sections or units that may be fitted and engaged with one another to provide a unitary trellis structure of desired height. Thus, for example, trellis units constructed according to the present invention have been found to have particular utility in providing a means for training indoor grown ivy or similar vines and climbers. As above suggested, the sectional features of the invention permits the trellis to be extended in height corresponding to the progressive increase in growth of the plant in connection with which the trellis structure is used.

The embodiment of the invention illustrated in the drawings is also constructed so that the plurality of identically constructed units can be positioned one upon the other in an alternative and nested condition of assembly. Hence, it is a further principal advantage and feature of the invention to provide a trellis capable of fulfilling the objects already mentioned, but which may also be assembled in compact form to facilitate storage and shipment of same.

Other numerous objects and advantages of the present invention will become apparent from reading the following specification and referring to the accompanying drawings in which similar characters of reference represent corresponding parts in each of the several views.

In the drawings:

Fig. 1 is a perspective view of the invention showing a plurality of trellis sections engaged together to form a unitary trellis structure.

Fig. 2 is a top plan view of one of the trellis units.

Fig. 3 is an enlarged sectional view taken substantially on line 3—3 of Fig. 1.

Fig. 4 is an enlarged fragmentary top plan view of one of the trellis units.

Fig. 5 is a view in side elevation and showing a plurality of trellis sections stacked together in nested relation.

Fig. 6 is an enlarged sectional view taken substantially on line 6—6 of Fig. 5.

Referring now more specifically to the drawings, the trellis structure embodying the invention is shown as comprising a plurality of identically constructed trellis sections or units indicated at $A_1$, $A_2$ and $A_3$ in Fig. 1 and indicated at $A_1$, $A_2$, $A_3$, $A_4$, $A_5$, $A_6$, $A_7$ and $A_8$ in Fig. 5. Although the individual trellis units may be constructed out of any suitable material, I have found it extremely satisfactory and economical to manufacture each unit entirely from extruded plastic material.

Each trellis unit is shown as comprising a circular, relatively flat body portion or annulus, indicated generally at 11, and three spacers or legs, indicated at 12, 13 and 14, extending therefrom in a common direction perpendicular to the plane of the said annulus 11.

The legs 12, 13 and 14 are attached to annulus 11 at equidistantly spaced points around the circumference of the latter. For purposes of convenient nomenclature, the side of the body portion of each unit from which the legs extend will sometimes be referred to hereinafter as the obverse side of the annulus, whereas the side of the body portion opposite that from which the legs extend will be referred to as the reverse side of the annulus. In this connection, three circumferentially equidistantly spaced leg-receiving wells indicated at 16, 17 and 18 are formed in each annulus 11. In the embodiment of the invention shown, the wells 16, 17 and 18 are located at spaced points coincident with the points of attachment of the legs 12, 13 and 14, respectively, to the annulus and extend through the plastic body portion or annulus 11 and into the upper portions of the legs 12, 13 and 14. Each well is substantially circular in cross-section but one wall surface is provided with an inwardly axially extending ridge or protuberance such as indicated at $19^a$, $19^b$ and $19^c$. As will more fully hereinafter appear, the purpose of the ridges or protuberances are to insure a tightly wedged frictional engagement between the interior walls defining the leg receiving wells and the foot portions of the legs received by the wells in assembled condition.

Each annulus 11 is also formed with a plurality of leg receiving apertures. More specifically, the drawings disclose twenty-one leg receiving apertures formed through the thickness of each body portion or annulus 11 of each unit. In Fig. 2 the seven leg receiving apertures located in the arcuate segment between legs 12 and 13 are designated consecutively by the numbers 20–26, inclusive; the seven leg receiving apertures formed in the arcuate segment of the body portion between legs 13 and 14 are designated by the consecutive numbers 120–126, inclusive; and the seven leg receiving apertures formed through the arcuate segment between legs 14 and 12 are numbered consecutively from 220–226, inclusive. It is observed that the spacing between each group of three apertures which end in the same two numbers are spaced from one another the same as the spacing between the legs 12—14 and the leg receiving wells 16—18, although the alignment of all of the leg receiving apertures is offset relative to the legs and the leg receiving wells. Thus, for example, the group of three leg receiving apertures indicated at 20, 120 and 220 in the drawings are spaced equidistantly and corresponding to the spacing between the three legs 12—14 and the three leg receiving wells 16—18. The group of leg receiving apertures 21, 121 and 221 are similarly spaced relative to one another, and so on. As will more fully hereinafter be explained, the primary function and purpose of the leg receiving apertures is to permit a plurality of the trellis units to be compactly stacked or nested together to facilitate shipment and storage.

The outer or lower end of each of the legs 12, 13 and 14 terminates in a foot portion $31^a$, $31^b$ and $31^c$ of reduced diameter and is proportioned to fit snugly within an associated leg receiving well 16—18, inclusive. In this connection, the diameter of the reduced foot portion of each leg is only slightly less than the diameter of the leg receiving wells. The provision of the inwardly protruding ridges 19 within the wells makes it unnecessary, however, to fashion either the foot portions of the legs or the leg receiving wells to extremely close tolerances to insure a snug fit. In this regard, the synthetic plastic material out of which the trellis units are preferably made is to a very limited extent at least resiliently deformable and, as a result, the reduced foot portions of the legs can be forcefully pressed into snug frictional engagement within the leg receiving wells whereby the protruding ridges 19 of the wells will partially deform and flatten in the process so as to maintain the legs in snugly wedge engagement within the wells.

Fig. 1 discloses how a plurality of the identically constructed trellis units or sections A1, A2, A3 can be positioned and assembled one upon the other in vertical column formation to form a unitary trellis structure. The depending legs of the lowermost unit A3 support the entire assembled unit, and generally speaking, it will be found convenient to embed the lower portions of the supporting legs of the bottom unit into the earth surrounding the plant which is to be trained within the trellis structure. In the assembly shown in Fig. 1, it is observed that the foot portions 31ª, 31ᵇ and 31ᶜ of legs 12, 13 and 14 of each of the upper units A1 and A2 are inserted and frictionally held within the leg receiving wells 16, 17 and 18 of an adjacent lower unit. Thus, for example, the foot portions of the three legs of unit A1 are engaged within the leg receiving wells of unit A2 disposed immediately below unit A1. Similarly, the foot portions of the three legs of unit A2 are engaged within the leg receiving wells of the bottom unit A3. It is believed apparent that a trellis structure of the character indicated might be extended to any desired heigh by adding additional sections. As a consequence, the height of the trellis structure in normal use can be progressively increased corresponding to the growth of the plant being trained.

Figs 5 and 6 illustrate how a plurality of the units designated at A1–A8, inclusive, can be stacked one upon the other in nested relation.

In this connection, it is observed that the units are stacked with the body portion 11 of each unit in contiguous and contactual relation with the body portion of an adjacent unit and with the legs of the lower units projected through aligned leg receiving apertures of the upper units. Thus, for example, the lowermost unit A1 is shown with its upwardly projecting legs extending through leg receiving apertures 20, 120 and 220 of unit A2, through leg receiving apertures 21, 121 and 221 of unit A3, through apertures 22, 122 and 222 of unit A4, through apertures 23, 123 and 223 of unit A5, through apertures 24, 124 and 224 of unit A6, through apertures 25, 125 and 225 of unit A7, through apertures 26, 126 and 226 of the top unit A8. Similarly, the three legs of second from the bottom unit A2 are projected through registering groups of leg receiving apertures of all of the upper units A3–A7, inclusive.

Although the present invention has been described in some detail by way of illustration and example for purposes of clarity of understanding, it is understood that certain changes and modifications may be practiced within the spirit of the invention as limited only by the scope of the claims appended hereto.

I claim:

1. A sectional trellis structure comprising: a plurality of identically constructed trellis units; each unit comprising a relatively flat circular open frame body portion; at least three legs attached at circumferentially equidistantly spaced points to the body portion of each unit and extending from a first side thereof in a common direction perpendicular to the plane of said body portion; at least three leg receiving and engaging wells formed in the second side of each body portion spaced relative to one another the same as the spacing between the three legs attached to the body portion of each unit; at least three leg receiving apertures formed through each body portion spaced the same as and offset relative to the said legs attached to and the said wells formed in the body portion of each of the units; said units positionable one upon the other in a vertical column to form a unitary trellis structure with the legs of each unit depending into engagement within the wells formed in the body portion of an adjacent lower unit; said units alternatively positionable one upon the other in nested relation with the body portions of adjacent units in contiguous contact with one another and with the legs of each unit projected upwardly through aligned leg receiving apertures of all units positioned above it.

2. A sectional trellis structure comprising: a plurality of identically constructed trellis units, each unit comprising a relatively flat circular open frame body portion; three legs attached at circumferentially equidistantly spaced points to the body portion of each unit and extending from a first side thereof in a common direction perpendicular to the plane of said body portion; each leg terminating in a foot portion substantially circular in cross-section; three leg receiving wells formed in the second side of each body portion and disposed in alignment with the three legs attached to the body portion of each unit; each well having only a slightly large diameter than the diameter of the circular foot portion of a leg adapted to be received by said well; each well formed with an inwardly projecting ridge of deformable plastic material to tightly frictionally wedge against a leg received in said well; at least three leg receiving apertures formed through each body portion spaced the same as and disposed in offset alignment relative to the legs attached to the said body portion and the said wells formed therein of each of the units; said units positionable one upon the other in a vertical column to form a unitary trellis structure with the foot portions of the three legs of each unit depending into engagement within the wells formed in the body portion of an adjacent lower unit; said units alternatively positionable one upon the other in nested relation with the body portions of adjacent units in contiguous contact with one another and with the legs of each unit projected upwardly through aligned leg receiving apertures of all units positioned above it.

References Cited in the file of this patent
UNITED STATES PATENTS
1,560,404  Brown _____ Nov. 3, 1925